July 24, 1928.
C. M. MANLY
TIRE
Filed Aug. 4, 1922
1,678,014
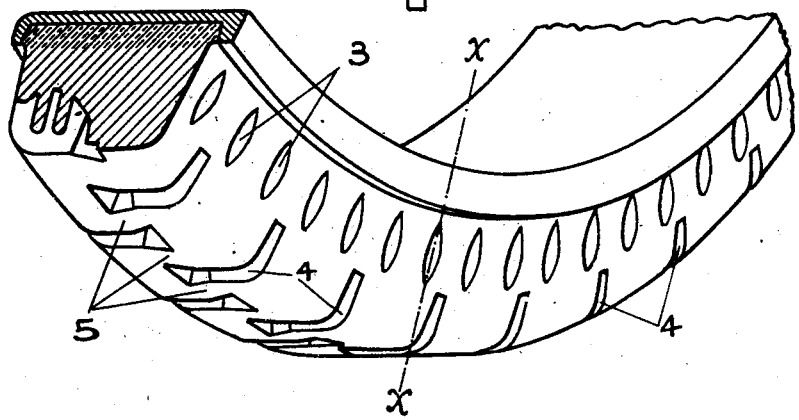
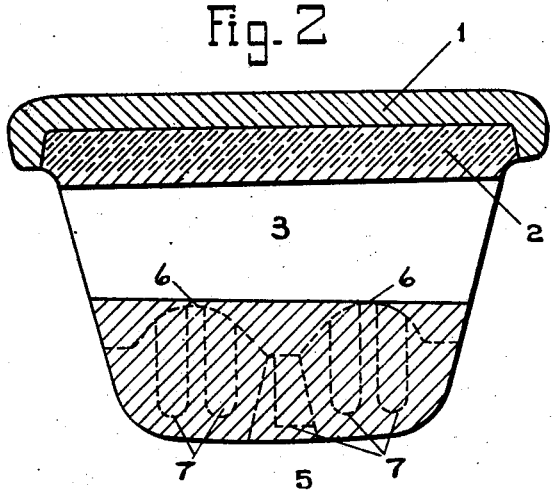
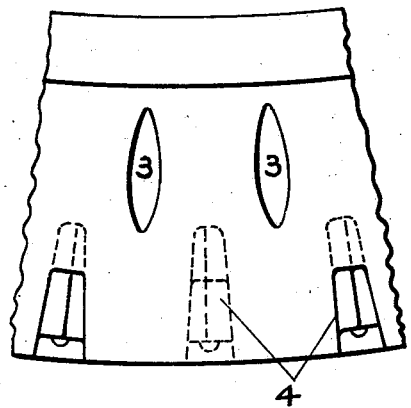
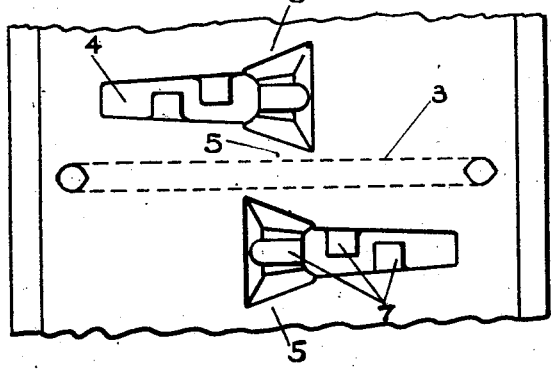
INVENTOR
Charles M. Manly
BY
ATTORNEY Patented July 24, 1928.

1,678,014

UNITED STATES PATENT OFFICE.

CHARLES M. MANLY, OF RICHMOND HILL, NEW YORK; JOHN M. MANLY, WILLIAM G. MANLY, AND BASIL M. MANLY, EXECUTORS OF SAID CHARLES M. MANLY, DECEASED, ASSIGNORS TO OVERMAN CUSHION TIRE COMPANY, INC., OF NEW YORK, N. Y., A CORPORATION OF NEW YORK.

TIRE.

Application filed August 4, 1922. Serial No. 579,646.

My present invention relates to improvements in tires which make the tire readily practical to manufacture and give it easy riding quality, lateral stability, durability, security of basal attachment, and other necessary and desirable qualities and advantages.

The drawings show one of the preferred embodiments of my present invention in tires. In them, Fig. 1 is a perspective view of a fragment of my tire with its vulcanized-on base band; Fig. 2 is a transverse section through same on the line X—X on a different scale, the section being taken medially through one of the lenticular cavities; Fig. 3 is a side elevation of a fragment of said tire and base band on the same scale as Fig. 2; and Fig. 4 is a plan view of the tread of a fragment of said tire.

I will now describe my invention in tires, particularly as same is embodied in the aforesaid tire of the drawings. Expressions of direction, such as "upper" and "lower" and the like, occurring in the description and the annexed claims, refer to a section of the tire located with its tread downwards as in Fig. 2.

1 is a flanged metal base band to which the base portion 2 is vulcanized, said band being adapted to be pressed on to the felloe band of a wheel.

The tire will be made as usual of rubber or rubber compound.

The sides of the tire preferably converge towards the tread which is preferably substantially flat as shown in the transverse section of Fig. 2.

A series of spaced apart oppositely pointed or double V-nosed cavities 3 extend transversely through the upper portion of the tire, each of said cavities having a lenticular cross section with a long radially-extending axis and a short circumferentially-extending axis, said radial axis being longer than one-quarter of the height of the soft material of the tire and the short axis being so proportioned to the long axis, and the curved sides of the cavity so shaped, that when the tire is under such a degree of compression from encountering an obstacle or from the load carried by it, that the sides of the cavity are thereby made to approximately touch each other at any point, the said sides will approximately touch at all points, or in other words close up uniformly. This ensures that at such a load or degree of compression, the sides of the columns of rubber formed by the spaced cavity mutually brace each other and thereby increase the stability and resistance to compression of the tire.

A series of spaced apart transverse clefts 4 extend radially into the tire from the tread preferably for at least one-quarter of the radial height of the rubber body of the tire; and extend laterally preferably for substantially more than half of the width of the tire, said clefts extending laterally from the middle portion through the right and left sides of the tire alternately. These tread-clefts in each instance preferably extend beyond the median line of the tread where they in effect provide, collectively considered, a circumferential tread-groove crossed at intervals by cross-webs 5. See especially the tread plan in Fig. 4.

The effect of thus providing a groove at the middle of the tread is to relieve this portion of the tread more than the portions on either side thereof, and the effect of the cross-webs 5 is to prevent the tire from splitting through this groove and also to tie together the outer portions of the tread to ensure adequate lateral stability while at the same time using the tread-groove to relieve the middle thereof, the laterally extending cavities 3 in radial alignment with the aforesaid cross-webs 5 acting as an internal relief for said cross-webs.

The tread-clefts 4 are preferably radially deepest at 6 intermediate the middle and the outer side-faces of the tire and contain the pebble-ejectors 7.

The radially extending inner ends of said clefts 4 and the radially extending outer ends of the cavities 3 are preferably located in substantially the same cylindrical middle zone of the tire. This, together with the fact that the series of cavities 3 and clefts 4 are staggered or alternated relatively to each other, and that they are correctly shaped, provides properly located spaces into which the rubber compression waves can expand for easy riding and shock-absorbing efficiency but without unduly weakening the cross sectional or the longitudinal strength of the tire.

The radially inner ends of said cavities 3 (being the upper end of the cavity 3 in Fig. 2) are arranged to be located in the soft rubber as indicated in said latter figure closely adjacent to but not in the layer 2 of harder vulcanized-on material forming the base portion of the tire, which latter, due to its being substantially inherently immune to the formation therein of circumferential compression-waves, permits the said compression-wave suppressing cavities to extend more closely to the inner periphery of the soft tire body than where said soft body is directly joined to the metallic base-band without the interposition of the harder layer 2. This confining of the cavities to the soft rubber body prevents said cavities from weakening the vulcanized-on attachment of the tire to the base-band, as does also the fact that said ends of these cavities are of reduced size.

By the provision of the lenticular shaped cavities in the upper portion of the body of the tire, or the elliptical cross-sectioned cavities with substantially pointed radially inner and outer ends in the said upper portion of the tire; I am able to dispense with the more expensive form of construction now in use, in which an internal longitudinal cavity is used to provide internal spaces into which the rubber body of the tire may expand, and at the same time I provide such properly distributed cavities or spaces for such expansion without having to make an entrance to said expansion space through the metal rim of the tire. Furthermore the construction here shown ensures better ventilation of the said expansion space, and thereby a more rapid removal of the internal heat from the walls of the cavities. By the combination of the transverse clefts extending in from the sides and tread of the tire and providing suitable expansion cavities into which the nose portion of the tire may expand, and the transverse cavities extending into the body portion and providing suitable expansion space into which the said body portion may expand, the whole body of rubber of the tire is provided with suitably located expansion space so distributed as to ensure that the several portions of the tire, such as tread, nose, and body, will each perform its proper functions without interfering with the proper functioning of any other portion.

Furthermore the combination of the series of spaced transverse clefts (open at the sides of the nose and through the tread and enlarging at the center of the tread into a tread-groove interrupted by the webs 5), with the series of spaced cavities in vertically staggered relation to the said clefts (and open to the sides of the body of the tire), results in the entire structure of the tire being converted into a series of connected load-carrying and shock-absorbing, compressible, superposed columns, each of which when in contact with the road at its tread end is provided with space which practically surrounds its nose portion (and into which it may freely expand under compression), and with the base end (comprising a multiple number of legs or units merging together just below and abutting against and), joined to the metal band, and with the body portion provided by means of the laterally extending cavities and the side faces of the tire with free space into which it may expand up to the limit permitted by the said cavities (beyond which expansion of the body portion of each column is restricted to the space at the side faces of the tire). The combined height of the superposed columns may thus be made such as to permit of large total compressions and consequently provide a high degree of cushioning effect, while the girth of each of the legs or units of the columns is sufficiently small to enable the rubber to compress quickly into the spaces in the nose and body portions, so that the tire is adapted to high speed work and can readily radiate the internal heat generated at such high speed. Also the interconnection of the columns into a circumferentially continuous annular body, gives the tire a high degree of circumferential strength, while the tread openings and cavities effectually prevent the existence of circumferentially travelling rubber waves.

One of the great advantages of my present form of tire in which an inner series of compressible columns has superposed upon it an outer series of compressible columns with the expansion spaces around the inner columns out of radial alignment with the spaces around the outer series of columns, is that while the total height of compressible column formation thus provided is such as to permit of a large compression, each of the series of columns is so short that the girth of the columns may be made very small without the columns showing a serious tendency to buckling collapse.

By extending transversely through the body of the tire, the cavities 3 make radially inner columns which by themselves would tend to be unstable against bending collapse in a direction extending circumferentially of the wheel. Similarly, if the transverse cavities 4 extended fully across the tire, the columns created thereby in the radially outer portion of the tire body would also tend to be unstable against bending collapse in a direction extending circumferentially of the wheel. In practical operation said outer columns would not only become upset themselves but would also upset the aforesaid inner columns, namely, those separated by the transverse cavities 3. The extent, location and general arrangement of the transverse cavities 4, like or substantially similar to that shown in the preferred form of my tire, creates outer columns which stabilize not only one another but also stabilize the aforesaid radially inner columns separated by the transverse cavities 3. Thus, said transverse cavities 4 create two adjacent rows of circumferentially spaced columns in the radially outer portion of the tire body, the columns of each row being staggered relatively to and laterally united by cross-webs 5 with those of the other row, whereby all of said outer columns are stabilized relatively to one another. Finally, said outer columns stabilize the radially inner columns by the fact that both of the aforesaid rows of outer columns bridge over the spaces 3 between the inner columns and structurally unite said inner columns.

Changes and modifications may be made in the practical embodiments of my present improvements which will, nevertheless, still be within the spirit of the foregoing description and within the meaning and spirit of the annexed claims and which as such are accordingly intended to be covered thereby.

What I claim is:

1. A cushion tire having a series of deep spaced apart transverse clefts extending radially into it from the tread and extending laterally from the middle portion through its right and left sides alternately; and a series of spaced apart cavities extending transversely through the radially inner portion of the tire and having in transverse section a long radially-extending dimension and a short circumferentially-extending dimension, said cavities alternating in circumferential location with said tread-clefts, the radially-inner ends of said clefts and the radially-outer ends of said cavities being located in substantially the same cylindrical zone of the tire.

2. A cushion tire having a series of deep spaced apart transverse clefts extending radially into it from the tread and extending laterally from the middle portion through its right and left sides alternately; and a series of spaced apart cavities extending transversely through the radially inner portion of the tire and having in transverse section a long radially-extending dimension and a short circumferentially-extending dimension, said cavities alternating in circumferential location with said tread-clefts, said cavities having their radially-inner and outer ends reduced substantially to points.

3. A cushion tire having a series of deep spaced apart transverse clefts extending radially into it from the tread and extending laterally from the middle portion through its right and left sides alternately; and a series of spaced apart cavities extending transversely through the radially inner portion of the tire and having in transverse section a long radially-extending dimension and a short circumferentially-extending dimension, said cavities alternating in circumferential location with said tread-clefts, said cavities having their radially-inner and outer ends reduced substantially to points, the radially-inner ends of said clefts and the radially-outer ends of said cavities being located in substantially the same cylindrical zone of the tire.

4. A cushion tire having a circumferentially continuous annular body of rubberlike material, the radially inner portion of said annular body comprising a series of circumferentially spaced columns, and the radially outer portion of said annular body comprising two adjacent rows of circumferentially spaced columns, the columns of each row being staggered relatively to and laterally united by cross-webs with those of the other row, and the columns of both rows bridging over the spaces between and uniting the columns of the aforesaid radially inner portion of the tire; the aforesaid spaces between the inner columns extending transversely through the tire body in substantially radial alignment with the aforesaid cross-webs.

Signed at New York, in the county of New York and State of New York, this 1st day of August, A. D. 1922.

CHARLES M. MANLY.